March 2, 1943.　　　　F. NUSSBAUM　　　　2,313,020
SEAT BACK
Filed April 2, 1940
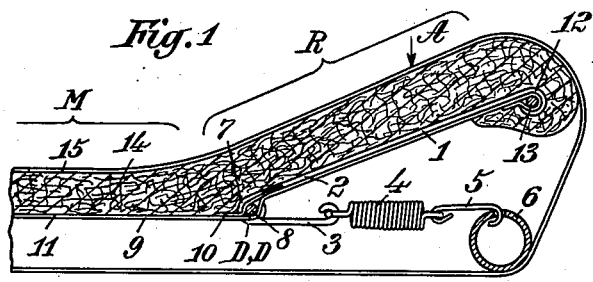
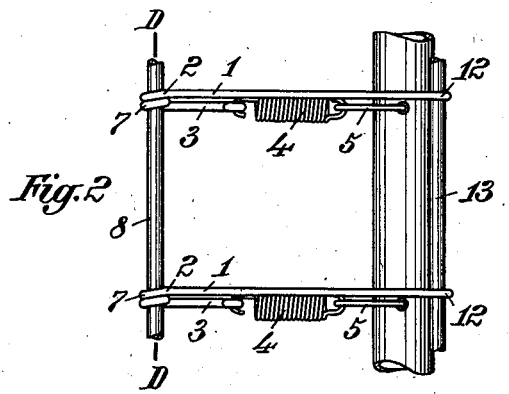
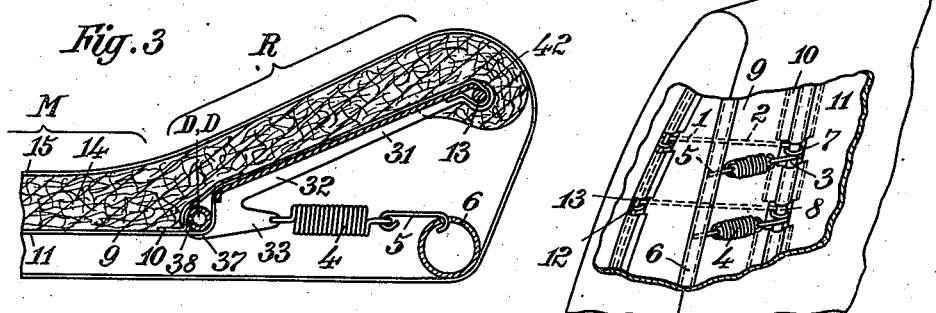
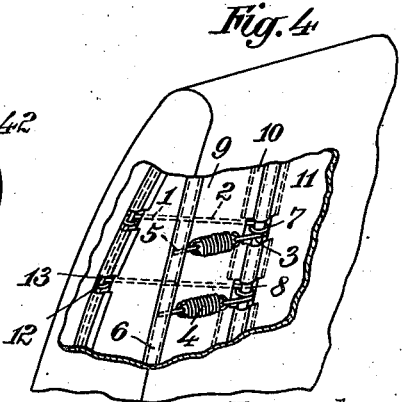
Inventor:
FERDINAND NUSSBAUM
ATTORNEYS

UNITED STATES PATENT OFFICE 2,313,020

SEAT BACK

Ferdinand Nussbaum, Stuttgart-Korntal, Germany; vested in the Alien Property Custodian Application April 2, 1940, Serial No. 327,396
In Germany March 30, 1939

9 Claims. (Cl. 155—179)

This invention relates to a seat back, and more particularly to one provided with forwardly extending edges on opposite sides of said back.

An object of this invention is to provide a simple and sturdy construction for seat backs having forwardly extending vertical edges.

Another object of this invention is to provide a simple arrangement for springing both the edges and central portion of a seat back.

Still another object of this invention is to provide a seat back in which the means for springing the central portion of the back also serve as springing means for the edges.

A further object of this invention is to provide a sprung seat back, particularly for vehicles, which is easily and quickly assembled and which, through a reduction in the number of parts is of appreciably less weight than constructions now known to the art.

Further objects and advantages of this invention will be apparent from consideration of the specification as illustrated by the accompanying drawing of possible embodiments of the invention, in which drawing:

Fig. 1 is a partial horizontal cross-sectional view illustrating the details of a preferred form of back construction according to this invention;

Fig. 2 is a view illustrating details of the construction taken in the direction of the arrow A in Fig. 1, with the cover and cushioning material removed;

Fig. 3 is a partial horizontal cross-sectional view similar to Fig. 1, showing another form of invention; and Fig. 4 is a perspective view on a smaller scale of a seat back formed in accordance with Figs. 1 and 2, with part of the outer seat covering removed.

As is readily apparent from a study of Figs. 1, 2 and 4, this invention is particularly concerned with a seat back of the type having vertical edge portions R extending forwardly at an angle to the substantially flat central portion M. The edges R are backed and supported by the one leg I of a plurality of V-shaped members 2, whose other legs 3 are resiliently attached through suitable means such as spiral spring 4 and hook 5 to the frame of the back, here indicated as a tubular frame member 6. In the preferred embodiment of the invention the V-shaped member 2 is preferably formed of spring wire and is given two turns 7 at the apex of the V forming a journal opening through which is passed a heavy wire 8 to form a free pivotal axis D about which the member 2 may move. It is to be understood that the edges R are formed identically on opposite sides of the central portion M of the seat, in which case the base covering or backing of the seat 9 will extend all the way across the seat from one edge to the other. Where the backing 9 passes by the wire rod 8 forming the pivotal axis for the V-shaped members 2, it is preferably attached about the wire or rod 8 by means of a looped construction 10 so that in this manner the central portion 11 of the backing 9 will be stretched between the frame member 6 on opposite sides of the seat back through this connection with the leg 3, springs 4 and hook 5.

The free end 12 of the leg 1 of the V-shaped member 2 and the ends of the backing 9 are attached about a heavy wire 13, the backing 9 being made of material, being preferably sewed about the wire 13. As will be seen in Fig. 4, the wire 13 running through each edge, is adapted to interconnect all of the ends 12 of the superimposed arms 1. The seat back is then provided with a suitable base or cushioning material 14 and an outer covering member 15, all in a manner known to those skilled in this art.

The modified form of invention illustrated in Fig. 3 is similar to that shown in Figs. 1, 2 and 4 except that instead of using angular members 2 formed of heavy spring wire, there is used a stiff sheet metal V-shaped member 32 whose one leg 31 supporting the seat back edge is preferably formed with a U-shaped profile, and whose other leg 33 is interconnected by means of a spiral spring 4 and hooks 5 with the tubular frame member 6. The members 32 are adapted to be journaled substantially at the apex of the V through the use of a hub 37 resting upon a free tubular rod 38. The backing 9 is again attached to the rod 38 through the provision of a loop 10, just as shown in Fig. 1. The free end 42 of the U-shaped leg 31 surrounds the wire edge support 13.

It will be immediately recognized that the invention described above fulfills all of the objects primarily stated. The chair can be assembled quickly and easily and the construction is extremely light and saving in material. Through the pivotal connection between the forwardly extending edges and the central portion of the seat back, the spring 4 serves both as springing means for the central portion of the chair and also for the edge R. In the form of invention illustrated in Figs. 1, 2 and 4, the use of heavy spring wire in the formation of the V-shaped edge supporting member also aids in the springing of the edge.

While the seat backs formed in accordance with the present invention have been designed particularly for use with automotive vehicles, it will be obvious that their use is not limited to such. For example, such seat backs are also peculiarly adapted to aeroplanes, because of their extremely light weight. If desired, it will also be clear that the principles of the present construction could be applied to the seats themselves, as well as backs.

Accordingly, while I have herein shown and described only certain embodiments of certain features of my present invention, it is to be understood that they are to be regarded merely as illustrative and that I do not intend to limit myself thereto except as may be required by the following claims.

I claim:

1. In a seat back, a pair of parallel spaced longitudinally extending frame members generally defining the width of said back, a plurality of V-shaped members having a journal opening at the apex of the V, arranged along the respective frame members and spaced inwardly therealong, means adjacent each of said frame members and parallel thereto engaging the opening of the corresponding adjacent V-shaped member and forming a pivot axis therefor, one arm of each of the V-shaped members extending toward its respective frame member, all of such arms lying substantially in the plane of said frame members, spring means joining said arms to the corresponding frame member, the other arms of said V-shaped members projecting outwardly and forwardly of said first-named arms and frame members, centrally positioned means stretched between the two axis-forming means, and a cushion member extending over and following the contour of the outwardly and forwardly projecting arms of the V-shaped members on one side, the centrally positioned means, and the outwardly and forwardly projecting arms of said V-shaped members on the other side to form a sprung seat back with forwardly projecting edges.

2. In a seat back, a central plane cushion section, cushioned edge sections on each side of said central section extending forwardly at an angle thereto, means for pivotally connecting said edge section to said central section, a frame for said seat comprising a pair of spaced parallel members, and common spring means for tensioning said central cushion section between said frame members and resiliently urging said edge section forwardly of said central section.

3. In a seat back, a central plane cushion section, cushioned edge sections on each side of said central section extending forwardly at an angle thereto, means for pivotally connecting said edge section to said central section, a frame for said seat back comprising a pair of spaced parallel members, and common spring means for resiliently supporting the central and edge cushion sections on said frame.

4. In a seat back, a pair of spaced parallel frame members, a cushion, a centrally disposed plane backing for said cushion, and means for tensioning said backing between said frame members including a pair of V-shaped members pivotally connected to opposite sides of said backing at the apex of the V and spring means connecting one leg of each V to the juxtaposed frame member in such a manner that the other leg of the V on each side forms forwardly extending side edges for said cushion.

5. In a seat back, a pair of spaced parallel frame members, a cushion, a backing on said cushion, a pair of V-shaped members having a journal opening at the apex of the V, means for attaching opposite sides of said backing and cushion to one leg of each V-shaped member, means forming a pivotal axis for each V-shaped member and extending through the opening therein, means for attaching the backing to each pivotal axis means, and spring means respectively attaching the other leg of each V-shaped member to one of said frame members.

6. The combination according to claim 5, in which the means for attaching the backing to the pivotal axis means comprises a loop formed in said backing.

7. The combination according to claim 5, in which the pivotal axis means each comprise rods extending through the journal openings in said V-shaped members.

8. The combination according to claim 5, in which each V-shaped member is formed of spring wire looped at its apex to form the journal opening.

9. The combination according to claim 5, in which each V-shaped member is formed as a solid integral piece whose leg to which the backing and cushion are attached has a U-shaped cross-section.

FERDINAND NUSSBAUM.